United States Patent [19]
Nosohara

[11] Patent Number: 5,956,740
[45] Date of Patent: Sep. 21, 1999

[54] DOCUMENT SEARCHING SYSTEM FOR MULTILINGUAL DOCUMENTS

[75] Inventor: Makifumi Nosohara, Hiroshima, Japan

[73] Assignee: ITI, Inc., Hiroshima, Japan

[21] Appl. No.: 08/740,044

[22] Filed: Oct. 23, 1996

[51] Int. Cl.[6] .................................................. G06F 17/30
[52] U.S. Cl. ............................... 707/536; 704/2; 704/8; 704/4
[58] Field of Search ................................. 707/536, 501, 707/513, 512, 202, 100, 3, 4, 5; 704/2, 8, 4, 277, 10, 5

[56] References Cited

U.S. PATENT DOCUMENTS

| | | | |
|---|---|---|---|
| 5,148,541 | 9/1992 | Lee et al. | 395/600 |
| 5,278,980 | 1/1994 | Pedersen et al. | 395/600 |
| 5,708,825 | 1/1998 | Sotomayor | 395/762 |

FOREIGN PATENT DOCUMENTS

| | | |
|---|---|---|
| 0725353 | 8/1996 | European Pat. Off. . |
| 0762299 | 3/1997 | European Pat. Off. . |
| 2193362 | 2/1988 | United Kingdom . |
| WO 89/02131 | 3/1989 | WIPO . |

OTHER PUBLICATIONS

Hong Yoon Kim et al., "A Presentation Agent for Multilingual Services", Proceedings of the Network Operations and Management Symposium, Feb. 14–17, 1994, vol. 2 of 3, Feb. 14, 1994, IEEE pp. 635–644, XP000452378.

Patent Abstracts of Japan, vol. 96, No. 12, Dec. 26, 1996 related to JP 08/202721 A, Oki Electric Ind. Co., Aug. 9, 1996, abstract.

Patent Abstracts of Japan, vol. 13, No. 475, Oct. 27, 1989, related to JP 01/185724 A, M C Waade Center K.K. Jul. 25, 1989, abstract.

*Primary Examiner*—Joseph H. Feild
*Assistant Examiner*—Alford W. Kindred
*Attorney, Agent, or Firm*—Smith Patent Office

[57] ABSTRACT

The present invention provides a system which enables searching documents at one time, even if they may be written in plural languages, according to key words written in the searcher's language. The system also enables translation of the search results into the searcher's language prior to being displayed. In the document searching system for multilingual documents of the present invention, the translation control means translates the key words written by the searcher's language is provided. Another translation control means for the search results that translates the whole text of the selected documents is provided independently. As for the key word translation means, a simple translation system is applied because the objects of the translation are words such as nouns, verbs and so forth. On the other hand, for the search result translation means, a high-level translation system may be applied because the objects of the translation are common sentences and the appropriate translation is deduced from the context of the document. Therefore, in the processing steps of the free key word translation means, where the search formula may be changed, added, modified or deleted frequently to improve the exactness of the search result, the processing speed in these steps is not decreased so that the whole system response may speed up.

8 Claims, 7 Drawing Sheets

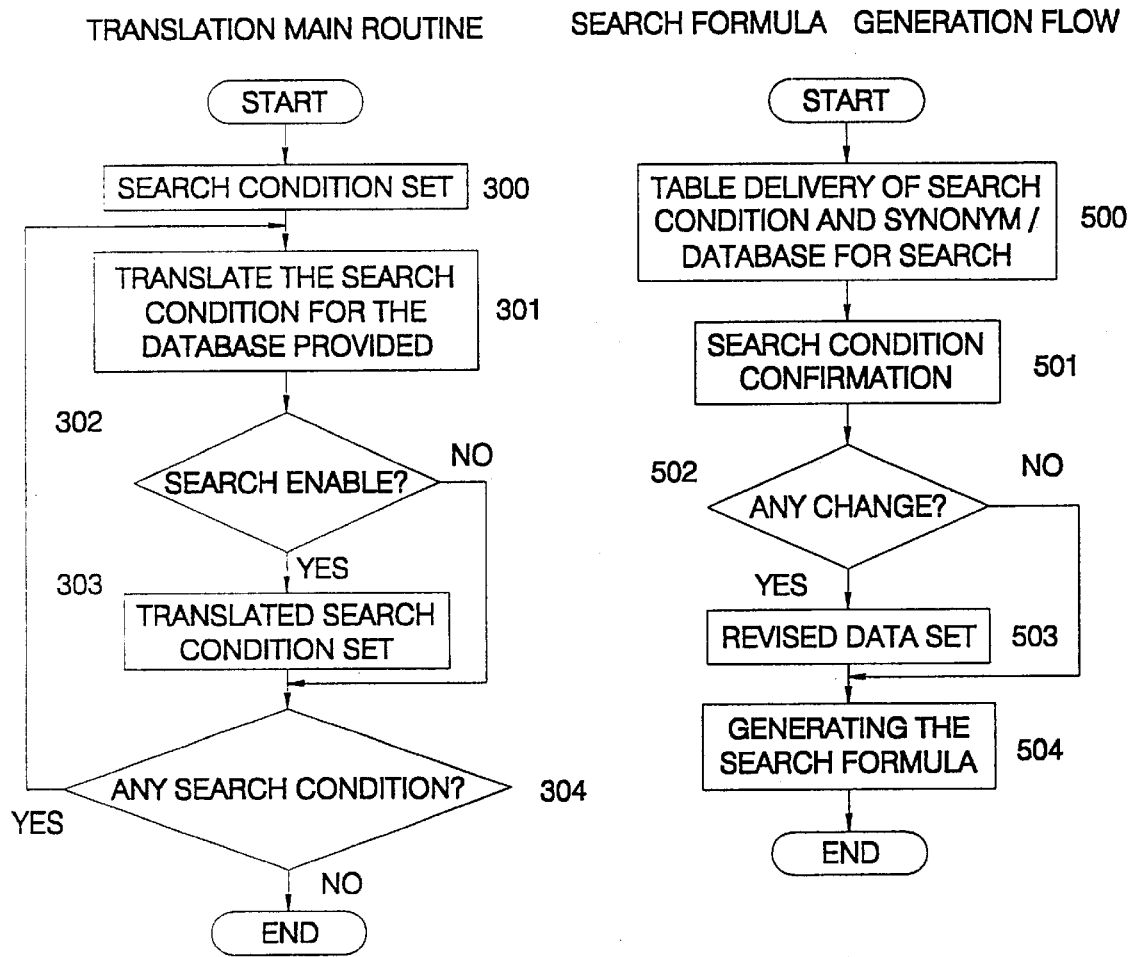

SEARCH RESULT EDIT FLOW

DOCUMENT SEARCHING SYSTEM FOR MULTILINGUAL DOCUMENTS

BACKGROUND OF THE INVENTION

1. Field of the Invention

This invention relates to a document searching system which enables to search discretionally the documents described by plural different languages (multilingual documents) according to the key word written by the designated language (e.g. native language) and to display the search result by the designated language.

2. Discussion of the Related Art

Recently information must be exchanged between areas having different languages from each other due to the development of communication networks, including the Internet. On the other hand, the information is currently delivered by the use of the electrical memory devices (such as databases, CD-ROMs, etc.). For example, information searching service systems use of databases of documents from science, technology and patents are prevalent.

When documents are searched for by the words used in the documents, it should be noticed that each author of their document may use different words to describe the same meaning, material, matter, etc. Therefore, the search result may miss some expected documents when the searcher fails to designate some alternative words. To prevent such errors, it is known to use a synonym dictionary to automatically collect the words or terms having identical or equivalent meanings and to make a search formula using the collected terms.

When the database to be searched is written in another language from the searcher's native language, the searcher should translate the key words for searching from their native language to that used in the database prior to inputting the search. Such a searching system has been provided in which the search formula input is written by the searcher's native language and then is translated automatically to that used in the database to be searched. The search is then carried out in the database. Such a system is disclosed by Japanese Kokai Patent No. 8-202721 where the search result is translated automatically to the searcher 's native language and then displayed.

The documents to be searched are generally text data only, but they are usually supplemented by objects such as drawings, photographs or animations. As for the search result, each object is usually arranged in a designated area and shown together with the text data on the same page. In this case, the object is linked to the text data by assigning a tag with specified function in the document, and such text is referred to as hyper-linked text. SGML and HTML, used in WWW, are two kinds of texts of this type. Such software such as viewers or browsers are generally utilized to interpret and develop the hyper-linked text and then display it.

Such a system may be constructed by combining these techniques mentioned above as follows. When the language used to input the search condition formula is different from that of the documents to be searched, the search condition formula is translated automatically to an equivalent one written in another language so as to include synonyms. The search is then carried out and then the search result is automatically translated to and displayed by the language defined during the input of the search condition formula.

SUMMARY OF THE INVENTION

There are several problems to be solved for the systems described above as follows.

First, the system automatically generates the synonyms of the search formula and translates them to other languages. This happens even if the documents to be searched are written in the same language used in the original search terms. Thus, if both the searcher's native language and the other languages are included this may complicate the search.

Second, when the documents to be searched include more than three languages such as Japanese, English, French and German, plural translating functions and means, that is, from English to Japanese, from English to French, and from English to German, are required. The translating function is generally applied to sentences and therefore, it is of a high technical level, has a large structure and is a complicated program. This causes the system response to be lowered when the program is packaged.

Third, when the search result is automatically translated, the whole result is unconditionally translated to the language used in the input of the search condition and therefore a longer time is required to translate the search results automatically.

Fourth, when the hypertext document is displayed with a format similar to the original document, this format depends on the intention of the author of the document. Therefore sometimes it may be inconvenient for the searcher because this format lacks linking at an expected location. When the text portion, such as each segment (paragraph) in the text, and the related object are displayed separately, useful formatting of the display is required to enable analysis of the document. The relationship between each element on the display, for instance, the relation between the drawing and the portion of the document referring to it, should be able to be confirmed on the display.

To solve these problems, an interactive and useful document searching system for multilingual documents is required which allows display of the search results more effectively and within a short time.

The document searching system f or multilingual documents of the present invention is characterized as described below to solve these problems.

The system of the present invention is provided with and characterized by an input means to input a search command including a search key word designated by the searcher; a translation control means for the key word to translate the key word input by the searcher into another language used in the document to be searched; a search formula generating means to generate a search formula from the key word transferred from the translation control means based on the key word; a search means to search a document storage means according to the search formula transferred from the search formula generating means; a search result storage means to store the searched and selected documents; another translation control means for the search result to translate the documents stored in the search result storage means to the designated language; and a display means to display the results of the translation.

The document searching system for multilingual documents of the present invention is provided with two translation means independent of each other. One is a translation control means for the key word to translate the key word written by the searcher's native language and the other is a translation control means for the search result which may translate the entire text of the documents selected as a search result. As for the key word translation means, a simple translation system shall be applied because the objects of the translation are words such as nouns, verbs and so forth. On the other hand, for the search result translation means, a high-level translation system shall be applied because the objects of the translation are common sentences and the appropriate translation is required by deducing from the context of the document.

Due to the application of the simple translation system to the processing steps of the free keyword translation means where the search formula may be changed, added, modified or deleted frequently to improve the exactness of the search result, the processing speed in these steps is not decreased so that the whole system response may speed up.

BRIEF DESCRIPTION OF THE DRAWINGS

FIG. 4 is a processing flow chart for the main routine of the translation function of the preferred embodiment of the present invention.

FIG. 6 is a processing flow chart for the search formula generating means according to the preferred embodiment of the present invention.

DETAILED DESCRIPTION OF THE PREFERRED EMBODIMENTS

Figure 1:
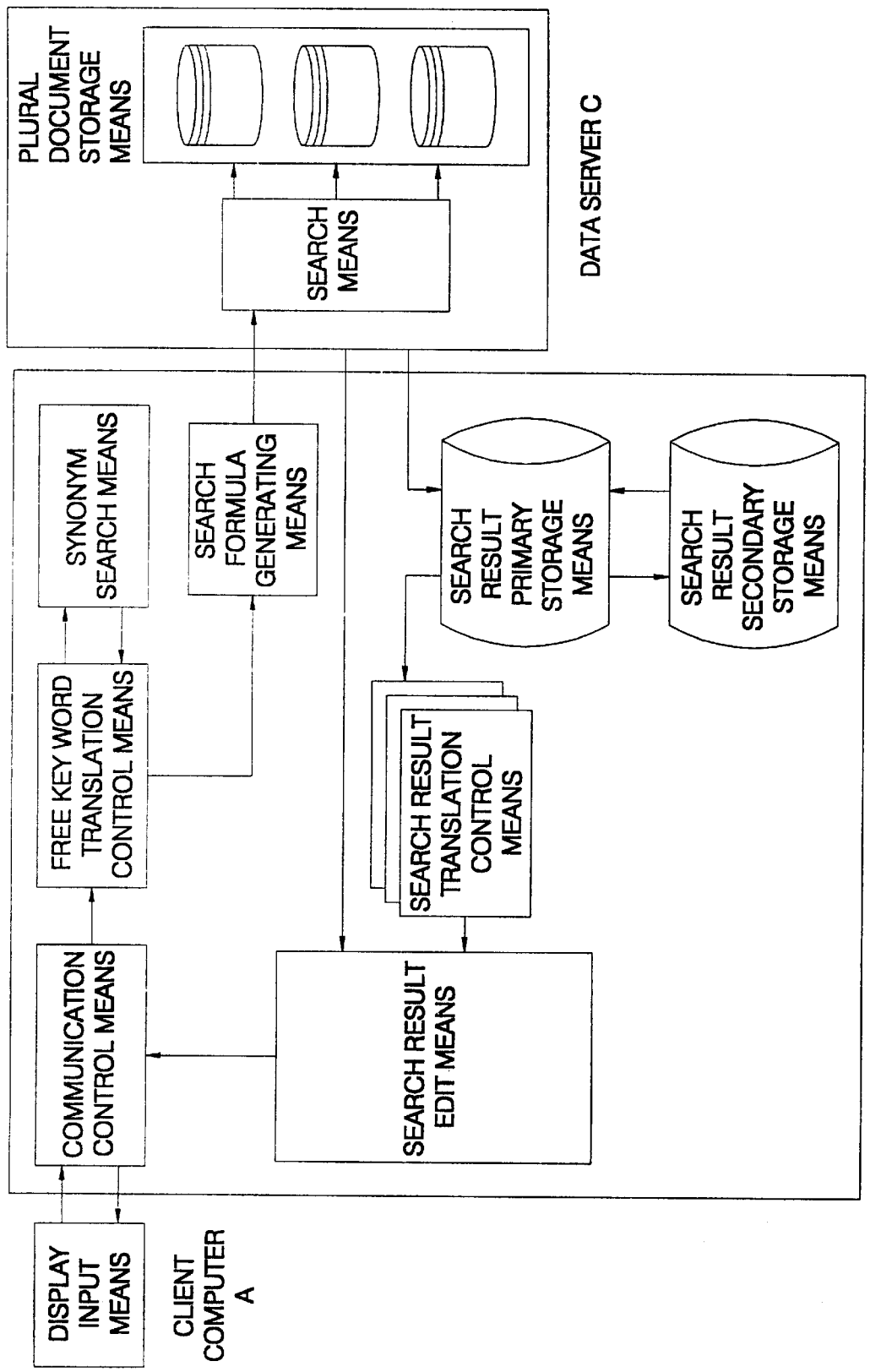
FIG. 1 is a functional block diagram showing the document searching system according to a preferred embodiment of the present invention.

The present invention will be described in detail with reference to the following drawings. FIG. 1 is a block diagram to show the functional structure of the system of the present invention. As shown in FIG. 1, a document searching system for multilingual documents is provided with a client computer A, an application server B and a data server C. The client computer A has a display input means 1. The display input means 1 takes the information input by the client into the system and transfers it to a communication control means 2 in the application server B through the communication network and also receives the information from the communication control means and then displays it.

The application server B comprises the communication control means 2; a translation control means 3 for a free key word to translate the free key word into the other required languages; a synonym search means 4 which is provided with the functions for registration and modification of the word in order to search and output the words having identical or equivalent meaning with the free key word input by the client; and a search formula generating means 5 which generates a search formula according to key words output from the translation control means 3 for the free key word. The application server B also comprises a primary storage means 8 for temporarily storing the search results; a translation control means 9 for optionally translating the search result; and an edit means 10 for editing the search results and outputting the edited results to the communication control means 2. In this embodiment, a secondary storage means 11 is added to the primary storage means 8 to enable temporary storage of the document which may be the search result just prior to being displayed or the document not yet translated.

The data server C comprises a search means 6 which works as a search engine; and a plural document storage means 7 which stores plural documents to be searched.

Figure 2:
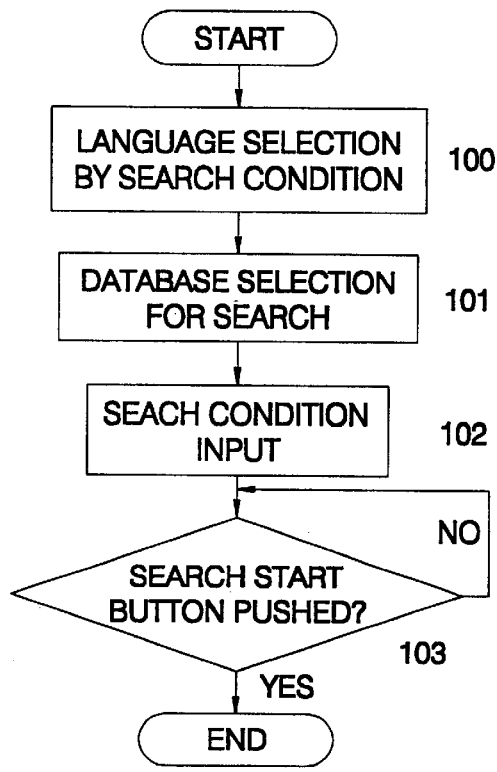
FIG. 2 is a flow chart that describes the operation of the preferred embodiment of the present invention.

Hereafter, the operation of the document searching system for multilingual documents will be described. Once the system starts a series of processes shown in FIG. 2 begins. First, the language used to define the search conditions is selected by the searcher (step 100) and then the databases to be searched are designated (step 101) and at the next step, the search condition is input (step 102). When the search start button is operated (step 103), the translation control means 3 for the free key word and the synonym search means 4 start processing.

Figure 5:
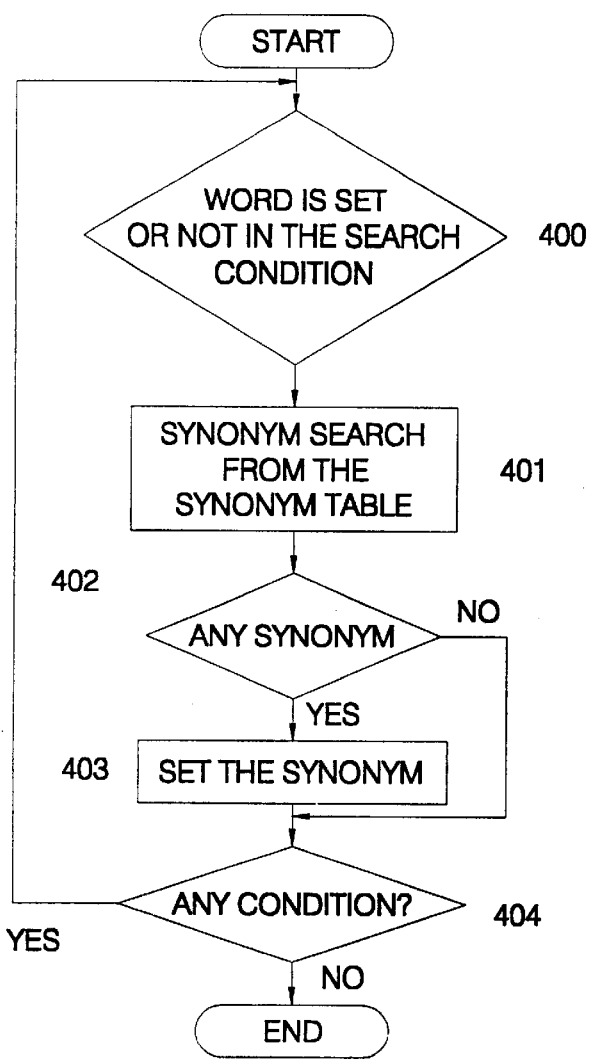
FIG. 5 is a processing flow chart for the synonym search routine according to the preferred embodiment of the present invention.
Figure 3:
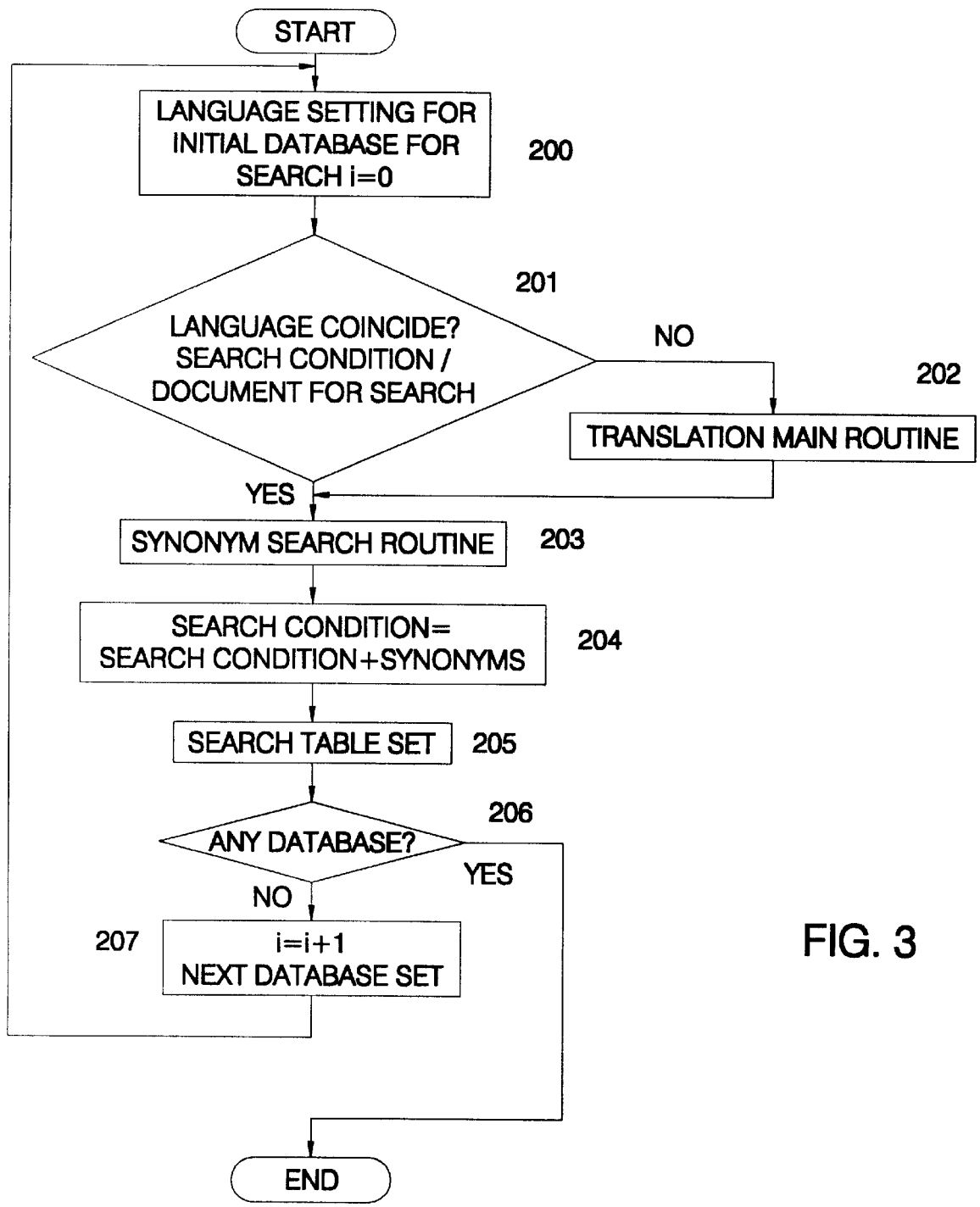
FIG. 3 is a processing flow chart for the free key word translation means of the preferred embodiment of the present invention.

When the translation control means 3 for the free key word starts its processing shown in FIG. 3, the initial condition is set (step 200). Then the language used to define and input the search conditions is checked to see whether it coincides with that of the documents to be searched. In case they coincide, the processing goes to the synonym search routine 202 (FIG. 5). In case they do not coincide, the processing goes to the translation function main routine 203 (FIG. 4) and then moves to the synonym search routine 202. At the step 204, the search condition is redefined to add the synonyms to the original search condition input by the searcher and set to a search table (i). The "i" is a variable. The databases to be searched and the corresponding search formula are set in the search table.

At the step 206, the databases to be searched are checked to see whether the next one is waiting or not. If a database is waiting, the variable "i" is added by 1 and the language for the next database waiting to be searched is set (step 207) and then the processing cycle returns to the step 201. When the next database is not waiting, the routine is terminated.

FIG. 4 shows a main routine for the translation function. The search condition is input at step 300. The search condition consists of the language used by the searcher, the free word used for searching and the languages used in the databases to be searched. Therefore the number of search conditions is decided by the combination of these elements. Once the search condition is set, the language used to define the search conditions is translated into other languages that are used in the databases to be searched (step 301). The search word is checked to see whether it is translatable or not at step 302. If translatable, the translated search condition is added (step 303). If not translatable, nothing is added and the corresponding portion is left blank. Then the search condition is checked to see whether another search condition is waiting or not (step 304), and if waiting, the cycle returns to step 301.

FIG. 5 shows a synonym search routine. When the processing shown in FIG. 5 is started, the search condition is checked to see whether the word is set or not (step 400). If the word is set, the synonyms of the word are picked up from the synonym tables defined for each language used for searching (step 401). If the synonyms are stored in the table (step 402), these synonyms are picked up (step 403). If no synonym is stored in the table, nothing will be picked up. Then the search condition is checked to see whether another search condition is waiting or not at step 404, and if waiting, the cycle returns to step 400.

Next, the operation of the search formula generating means will be described with reference to the flow chart shown in FIG. 6. The search formula generating means 5 receives the table in which the synonyms for the free key word in the search condition and the database to be searched are stored from the free key word translation means (step 500). Then the searcher is asked to confirm the contents of each search condition (step 501). The searcher checks whether the search condition should be changed or not (step 501) and if changed, revised data will be set (step 502). The revision by the searcher includes the confirmation, the addition and the deletion of synonyms. When step 501 results in no revision, the information from the free key word translation means is used as it is. Then the search formula is generated (step 503).

Hereafter, the operation of the search formula generation will be described. The case where both Japanese Patents and U.S. Patents are searched by the use of Japanese language will know be described. When the Japanese kanji character defined as "KURUMA" is designated in the search condition, the translation control means translates it into the English word "car" and the synonym search means will output other Japanese kanji characters defined as "SHARYOU" and "JIDOUSHA" from the Japanese synonym table as well as other English words "vehicle", "automotive" and "automobile" from the English synonym table. Then these results are returned to the translation control means. When the documents to be searched are stored in the relational database (RDB), the search formula generating portion (step 503) generates a search formula referred to as SQL (Structure Query Language) as follows:

"select Patent No., Title from JP where text like the kanji characters representing KURUMA or SHARYOU or JIDOUSHA;"

"select Patent No., Title from USP where text like % car % or text like % vehicle % or text like % automotive % or text like % automobile %;". Where, "Patent No., Title" means the field name; JP means the table name in which Japanese Patents are stored; and USP means the table name in which U.S. Patents are stored respectively.

The search formula mentioned above means that the Patent No. field of the records in which either of "KURUMA", "SHARYOU" or "JIDOUSHA" is included and the data of the corresponding Title field are output to the text field from the JP table in which the Japanese Patents are stored ; and that the Patent No. field of the records in which either of "car", "vehicle", "automotive" or "automobile" is included and the data of the corresponding Title field are output to the text field from the USP table in which the U.S. Patents are stored.

The example of the search formula mentioned above is written to make a simple explanation for generating the search formula. Therefore other types of search formulas with individual and general links can be generated because the search method of the document with links for the data server which includes plural storage means of the document with links.

The RDB search means and the search means of the document with link execute the search according to the information from the search formula generating means. General and known search methods are applied to these search methods, so their description has been omitted.

Figure 7:
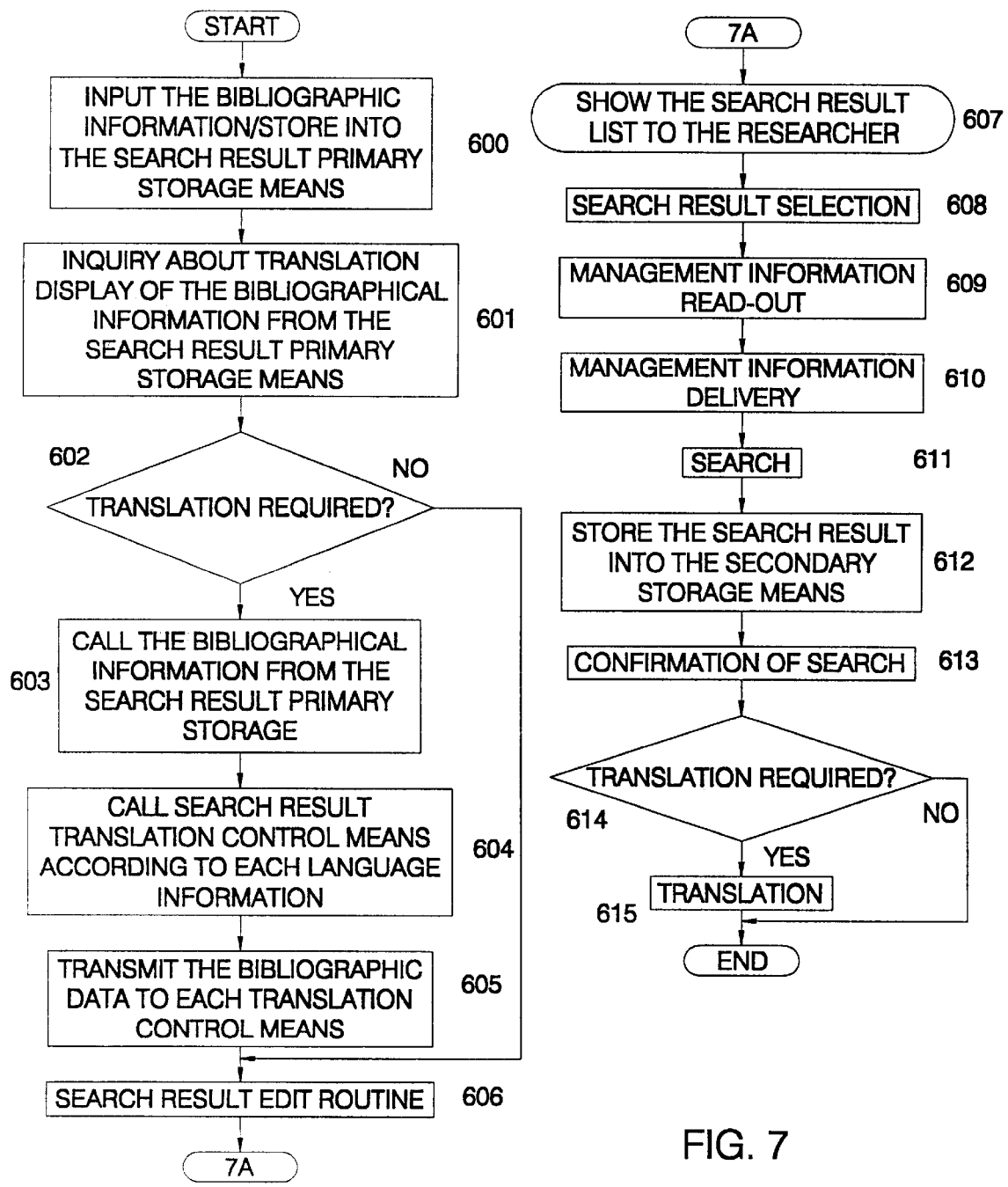
FIG. 7 is a processing flow chart showing the display operation of the information according to the preferred embodiment of the present invention.

A process to show the information output by the search means to the searcher will be described with reference to the flow chart shown in FIG. 7. The number of the selected documents as the search result, and their information including the identification of the sentence, the title, the author and the like and their management information are stored in the primary storage means 8 for the search result (step 600). This information is generally referred to as bibliographic data. The management information comprises language information to identify the kind of the languages and the location information to indicate the location of the sentence. The primary storage means 8 for the search result reserves a designated amount of memory when the searcher is logged in the system. The amount of memory defines the upper limit of the number of searches. This area of memory is reserved until the searcher logs-out and is then released at the same time of the log-out.

The searcher is inquired at the step 601 about whether the bibliographic information mentioned above should be translated and displayed or not. When translation is required (step 602), the information stored in the primary storage means 8 for the search result is read out (step 603). Then the translation control means for the search results is called according to required individual language information and in the next step the translation is carried out (step 604). Then the bibliographic information is transmitted to each translation function (step 605) and it is then transferred to the search result edit routine (step 606) and at the next step 607 the search result list is displayed to the searcher. When the translation is not required at step 602, step 606 will be executed directly. When the searcher selects the sentence (e.g. title) to be shown (step 608),the management information for the selected sentence is read out (step 609) and the management information is delivered to the search means as a search condition (step 610). At the next step 611, the search is executed by the search means and then the search result is stored in the secondary storage means 11 (step 612). At this step, the whole document and the corresponding objects are stored. The secondary storage means 11 is linked with the primary storage means 8. The searcher is inquired at the step 613 whether the translation should be carried out or not and then the necessity of the translation is judged (step 614) and if necessary, whole sentences or designated portions are translated at step 615.

Figure 8A:
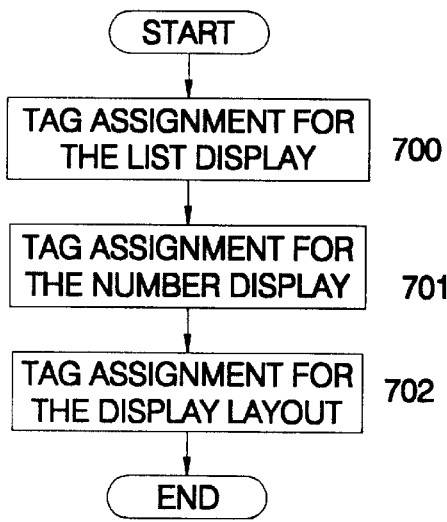
FIG. 8A is a processing flow chart of the search result edit means of the preferred embodiment of the present invention.
Figure 8B:
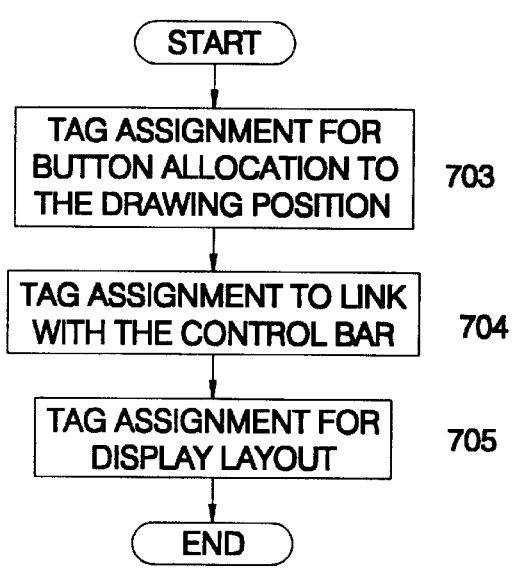
FIG. 8B is another processing flow chart of the search result edit means according to the preferred embodiment of the present invention.

An operation of the search result edit means will be described with reference to the flow chart shown in FIGS. 8A and 8B. FIG. 8A is a process to show the list of the search result and a tag is assigned to show the list (step 700) and then another tag is assigned to show the number of hits in the search result (step 701). In the next step, another tag is assigned for the display layout, for instance, it may be a tag for a button to display the result of the translation (step 702). FIG. 8B shows another case where each content to be displayed is respectively defined and a tag is assigned to allocate the button to the position of the drawing (step 703) and then another tag is assigned to link with the control bar on the display (step 704). In the next step, another tag is assigned to structure the display layout (step 705). The display layout made by these processes will be described with reference to FIG. 9.

Figure 9A:
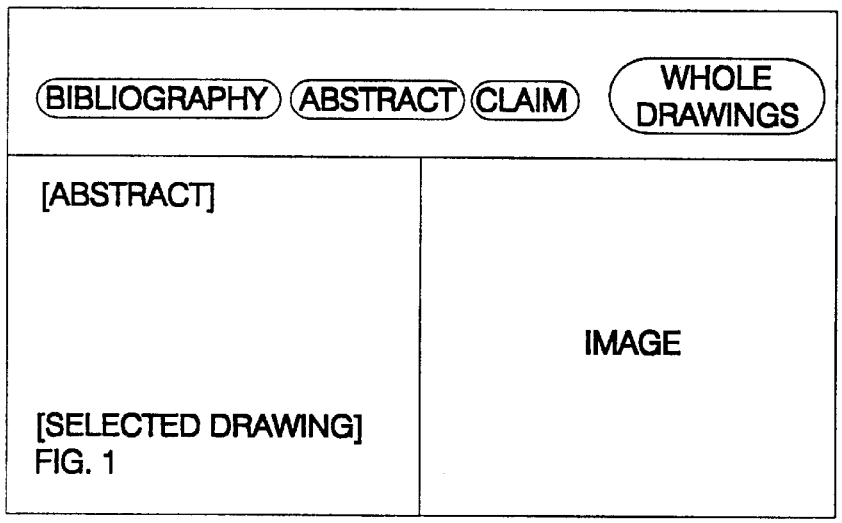
FIG. 9A is a diagram showing one variation of the picture shown on the display of the preferred embodiment of the present invention.
Figure 9B:
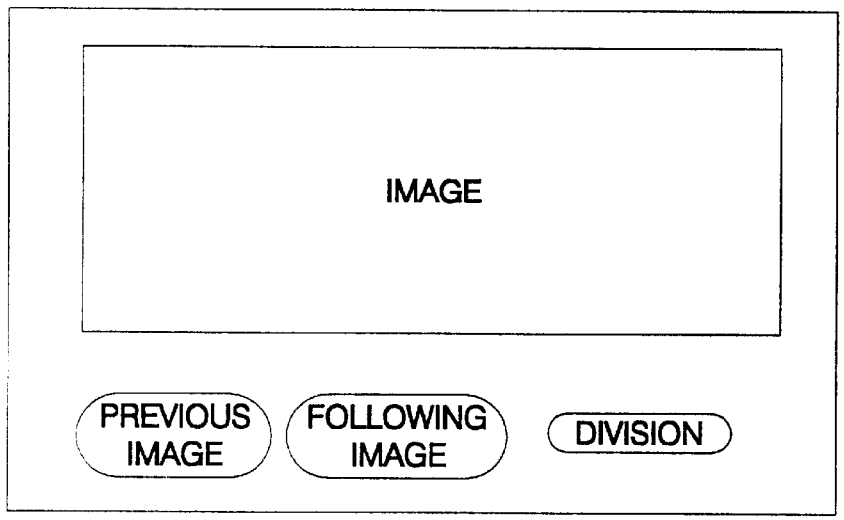
FIG. 9B is a diagram showing another variation of the picture shown on the display of the preferred embodiment of the present invention.
Figure 9C:
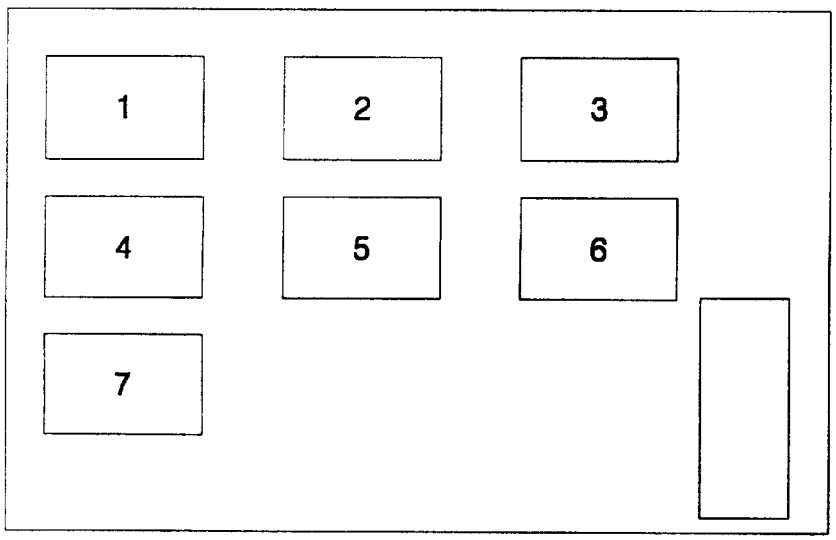
FIG. 9C is also a diagram showing yet another variation of the picture shown on the display of the preferred embodiment of the present invention.

FIG. 9 shows an example where the present invention is applied to the search system of a patent journal. FIG. 9(A)

shows a basic display layout. The frame is divided into three areas: an area 20, an area 30 and an area 40. The area 20 is used to show a control bar in which is arranged the bibliographic information of the patent. For example, a button 21 can be used to indicate the patent publication number, the assignee and the like and to display them on the area 30. A button 22 can be used to show the abstract of the patent; a button 23 can be used to show the claim of the patent; and a button 24 can be used to show all of the drawings included in the patent. The area 30 is used to show the contents of the item designated by these buttons. In this embodiment, the abstract information is displayed. The drawing number previously selected by the assignee (e.g. FIG. 1) is included in the abstract information. When the selected drawing number is indicated on the display, the image drawing corresponding to that Figure number is displayed on the area 40 (object frame). The drawing number included in the abstract can also call the corresponding drawing onto the display by clicking on that number. When the select all drawings button 24 of the area 20 is clicked under this condition, the frame shown in FIG. 9B is displayed. This frame comprises an area 50 to show the current image drawing; a button 51 to call the previous image drawing; a button 52 to call the following image drawing; and a button 53 to call all the drawings at the same time in one frame. When the button 53 is selected under this condition, the frame shown in FIG. 9C is displayed. In this frame all of the drawings are displayed, seven drawings in this embodiment, and an area 60 for the image drawing selection list which enables the searcher to select the drawing to be enlarged. When the searcher indicates the drawing number from the image drawing selection list, the image drawing will be displayed in the form shown in FIG. 9B.

Effect of the Present Invention

The document searching system for multilingual documents of the present invention is provided with two translation means that are independent of each other as described above. That is, one is a translation control means for the translating the key words written by the searcher's language into another language. The other translation control means is for the search results which may translate the whole documents selected as a search result. As for the key word translation means, a simple translation system is applied because the objects of the translation are words such as nouns, verbs and so forth. On the other hand, for the search result translation means, a high-level translation system may be applied because the objects of the translation are common sentences and the appropriate translation is required by deducing from the context of the document. Therefore, in the processing steps of the free key word translation means where the search formula may be changed, added, modified or deleted frequently to improve the exactness of the search result, the processing speed in these steps is not decreased and therefore the whole system response may speed up.

What is claimed is:

1. A document searching system for multilingual documents comprising:

an input means to input a search command including a search key word designated by the searcher;

a key word translation control means for translating the key word input by the searcher into other languages used in the documents to be searched;

a search formula generating means to generate a search formula from the key words transferred from said key word translation control means for the key word;

a search means to search a document storage means to store documents according to said search formula transferred from said search formula generating means;

a search result storage means to store the selected documents;

a search result translation control means for translating said search result stored in said search result storage means to the language designated in the input of the search condition;

a display means to display the result of the translation; and wherein said key word translation control means and said search result translation control means are independent from each other so that said key word translation control means translates key words and said search result translation control means translates at least sentences of the selected documents.

2. A document searching system for multilingual documents as claimed in claim 1, wherein said documents are documents with links.

3. A document searching system for multilingual documents as claimed in claim 1, wherein said system additionally comprises a synonym search means to output synonyms of the search key word inputted by the searcher.

4. A document searching system for multilingual documents as claimed in claim 3, wherein said synonym search means additionally comprises a synonym storage means and a writing means to rewrite said synonym storage means.

5. A document searching system for multilingual documents as claimed in claim 1, wherein said search formula generating means is provided with a synonym modification means which enables changing the selected synonyms.

6. A document searching system for multilingual documents as claimed in claim 1, wherein said search result translation control means is provided with a translation area designating means to designate an area to be translated.

7. A document searching system for multilingual documents as claimed in claim 1, wherein said search result storage means is provided with a primary storage means to store bibliographic information of the search result and a secondary storage means to store the whole text of the documents.

8. A document searching system for multilingual documents as claimed in claim 2, wherein said document with link includes links in HTML.

* * * * *